United States Patent [19]

Freeman et al.

[11] Patent Number: 4,779,142
[45] Date of Patent: Oct. 18, 1988

[54] SYSTEM AND METHOD FOR ELECTRONICALLY RECORDING AND PLAYING BACK VIDEO IMAGES WITH IMPROVED CHROMINANCE CHARACTERISTICS USING ALTERNATE EVEN AND ODD CHROMINANCE SIGNAL LINE MATRIX ENCODING

[75] Inventors: William T. Freeman, Brookline, Mass.; Marnix G. Collet, Geldrop, Netherlands

[73] Assignees: Polaroid Corporation, Cambridge, Mass.; U.S. Philips Corp., New York, N.Y.

[21] Appl. No.: 19,971

[22] Filed: Feb. 27, 1987

[51] Int. Cl.[4] .......................... H04N 9/79; H04N 9/67
[52] U.S. Cl. ...................................... 358/313; 358/30; 358/906; 360/33.1; 360/35.1
[58] Field of Search ............... 358/310, 313, 314, 320, 358/330, 335, 906, 909, 30, 41, 44, 12, 14, 244; 360/33.1, 35.1, 9.1, 11.1

[56] References Cited

U.S. PATENT DOCUMENTS

| | | |
|---|---|---|
| 3,518,360 | 6/1970 | Gibson et al. |
| 4,027,333 | 5/1977 | Kaiser et al. .............. 358/313 X |
| 4,214,258 | 7/1980 | van der Valk ............ 358/906 X |
| 4,245,235 | 1/1981 | Poetsch ........................ 358/14 |
| 4,335,393 | 6/1982 | Pearson . |
| 4,345,272 | 8/1982 | Shirota . |
| 4,470,076 | 9/1984 | Arai et al. ................... 358/906 X |
| 4,516,151 | 5/1985 | Stahler ......................... 358/14 |
| 4,541,010 | 9/1985 | Alston ........................ 358/906 X |
| 4,584,598 | 4/1986 | Kutaragi .................... 358/906 X |
| 4,647,987 | 3/1987 | Nutting ...................... 360/35.1 X |
| 4,649,433 | 3/1987 | Verhoeven ................. 358/244 |

*Primary Examiner*—Alan Faber
*Assistant Examiner*—W. R. Young
*Attorney, Agent, or Firm*—Edward S. Roman

[57] ABSTRACT

Apparatus and method for encoding and recording electronic image information signals in a manner whereby luminance signals for odd field lines are recorded in association respectively with chrominance signals alternately selected from both the even field lines and the odd field lines and luminance signals for even field lines are recorded in association respectively with the remaining chrominance signals alternately selected from both the even field lines and the odd field lines. Chrominance samples recorded in this manner are spaced only two field lines apart thereby allowing the chrominance signals to be interpolated by a playback device specially configured to provide for increased vertical chromianance resolution. Chrominance samples recorded in this manner may also be played back with a conventional playback device, which does not provide the increased vertical chrominance resolution while such a specially configured playback device can play back chrominance samples recorded in standard format without providing the increased vertical chrominance resolution.

28 Claims, 2 Drawing Sheets

SYSTEM AND METHOD FOR ELECTRONICALLY RECORDING AND PLAYING BACK VIDEO IMAGES WITH IMPROVED CHROMINANCE CHARACTERISTICS USING ALTERNATE EVEN AND ODD CHROMINANCE SIGNAL LINE MATRIX ENCODING

BACKGROUND OF THE INVENTION

1. Field of the Invention

This invention relates generally to an apparatus and method for electronically recording and playing back video images and, more particularly, to an apparatus and method for encoding and recording electronic image information signals in a manner whereby vertical chrominance resolution may be substantially increased upon playback of the coded video signals.

2. Description of the Prior Art

Electronic imaging cameras for recording still images are now well known in the art. Such cameras can record a plurality of still images on a single magnetic disk or tape in either analog or digital format for subsequent playback on any well-known cathode ray tube viewing device or for subsequent recording a hard copy by any one of a variety of copiers such as photographic, thermal, ink jet, etc. Recently, the Japanese have standardized the magnetic disk in which the still images are recorded to a 47 mm floppy disk. In the 47 mm video floppy disk format, each frame of the image is stored as two interlaced fields of odd and even field lines. Luminance information (Y) is stored for every line while each of two chrominance components (R-Y) and (B-Y), i.e., red minus luminance and blue minus luminance, is stored in every other line of every field as shown in Table No. 1 below.

TABLE NO. 1

| Frame Line No. | Stored Information | |
|---|---|---|
| | Field 1 | Field 2 |
| 1 | $Y_1, R_1 - Y_1$ | |
| 2 | | $Y_2, R_2 - Y_2$ |
| 3 | $Y_3, B_3 - Y_3$ | |
| 4 | | $Y_4, B_4 - Y_4$ |
| 5 | $Y_5, R_5 - Y_5$ | |
| 6 | | $Y_6, R_6 - Y_6$ |

As is readily apparent, each chrominance component (R-Y) and (B-Y) is sampled on two adjacent lines of the full frame image and then not sampled for the next two lines and so on. That offset sampling pattern provides lower vertical chrominance resolution than if each color component were sampled on every other line. The desired every other line color sampling is shown below in Table No. 2.

TABLE NO. 2

| Frame Line No. | Sample |
|---|---|
| 1 | $R_1 - Y_1$ |
| 2 | $B_2 - Y_2$ |
| 3 | $R_3 - Y_3$ |
| 4 | $B_4 - Y_4$ |
| 5 | $R_5 - Y_5$ |
| 6 | $B_6 - Y_6$ |

For a standard interlaced system, the sampling pattern of Table No. 2 would cause each field to contain samples of only one chrominance component so that the odd numbered frame lines (odd field) would contain only R-Y information and the even numbered frame lines (even field) would contain only B-Y information which would be incompatible with the 47 mm video floppy standard.

Therefore, it is a primary object of this invention to provide an apparatus and method in which video image data may be sampled in the manner of Table No. 2 to provide increased vertical chrominance resolution and thereafter coded in a manner that is compatible for recording on the standard 47 mm floppy disk.

It is a further object of this invention to provide an apparatus and method for playing back information recorded in the manner of this invention to enable the reconstruction of images having improved vertical chrominance resolution.

Other objects of the invention will be, in part, obvious and will, in part, appear hereinafter. The invention accordingly comprises a mechanism and system possessing the construction, combination of elements and arrangement of parts which are exemplified in the following detailed disclosure.

SUMMARY OF THE INVENTION

A system for encoding and recording a video signal comprises means for sensing at least three different colors of light from a subject along a plurality of succeeding substantially parallel lines over a two-dimensional light sensing area and for providing an electronic information color component signal for each of the light colors so sensed. Means thereafter operate to provide: a luminance signal as a function of a select matrix of the color component signals for each of the substantially parallel lines; a first chrominance signal as a function of the select matrix of the color component signals for every odd line of the substantially parallel lines; and a second chrominance signal as a function of the select matrix of the color component signals for every even line of the substantially parallel lines. Means are also provided for recording luminance signals for every one of the odd lines of the substantially parallel lines in a manner whereby the luminance signals for every one of the odd lines are recorded in alternate association respectively with the first and second chrominance signals for first select alternate odd lines and alternate even lines. Means also operate to record the luminance signal for every one of the even lines of the substantially parallel lines in a manner whereby the luminance signals for the even lines are recorded in alternate association respectively with the first and second chrominance signals for second select alternate odd lines and alternate even lines.

A system is provided for decoding the video image information recorded in both even and odd field lines on a recording medium where the luminance information is recorded for both the even and odd field lines, first chrominance information is recorded for the odd field lines and second chrominance information is recorded for the even field lines. The system provides means for converting the recorded luminance information to electronic luminance signals in a select order of field lines whereby all of either the even or odd field lines are first converted and then all of the remaining even or odd field lines are thereafter converted. Means are provided for converting: the first chrominance information to first electronic chrominance signals in concert with the conversion of the luminance signals for the odd field lines, the second chrominance information to second electronic chrominance signals in concert with the conversion of the luminance signals for the even field lines, the second chrominance information to the second chrominance signals and thereafter interpolating the second chrominance signals for odd field lines in concert with the conversion of the luminance information for the odd field lines; and the first chrominance information to the first chrominance signals and thereafter interpolating the first chrominance signals for even field lines in concert with the conversion of the luminance information for the even field lines. Means are provided for matrixing: the luminance signals for the odd and even field lines; the first and second chrominance signals and the interpolated chrominance signals for the odd and even lines to provide electronic information color component signals from which a visible image of the recorded information may be made.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
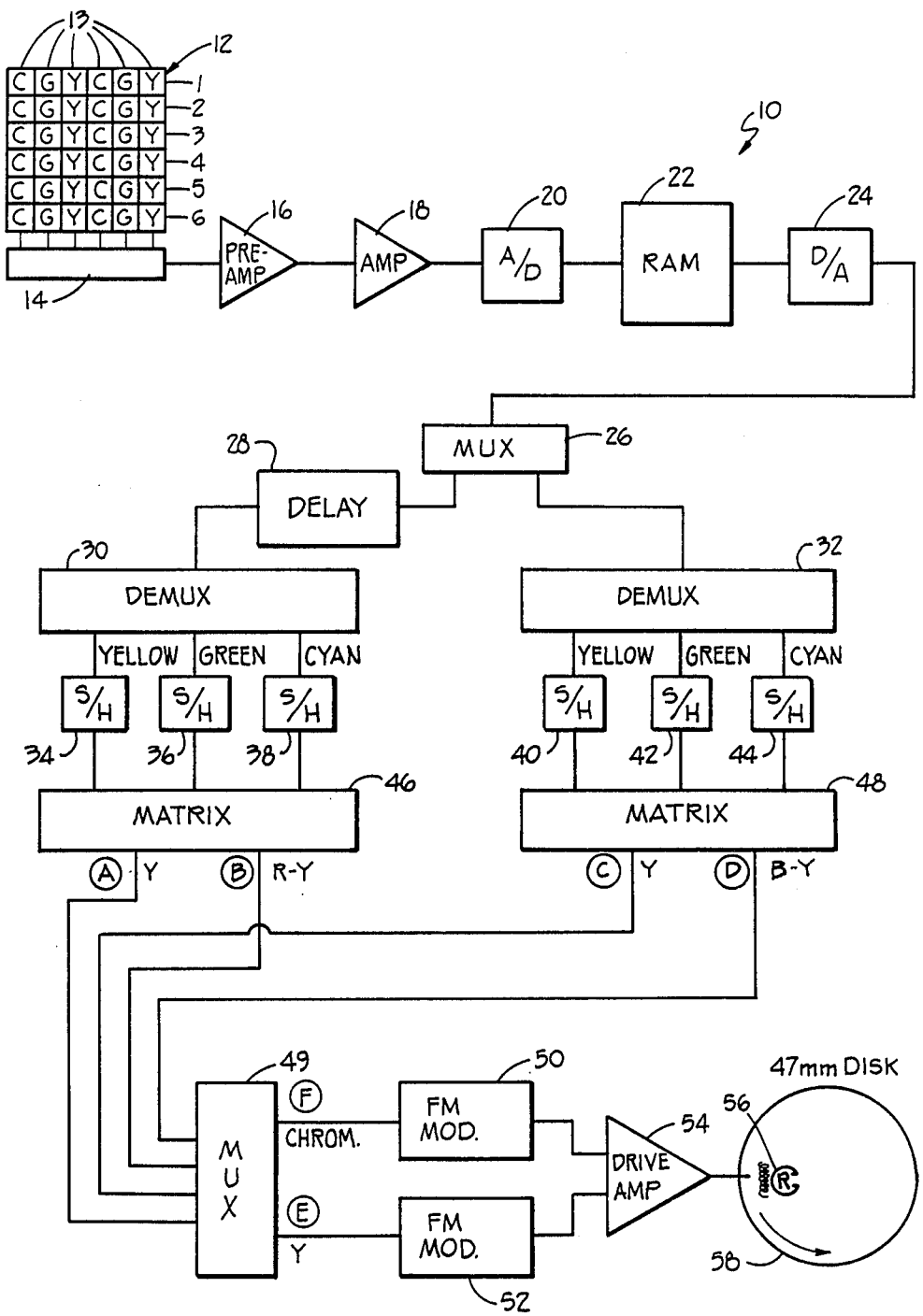
FIG. 1 is a schematic circuit diagram for the system of this invention for encoding and recording a video signal.

Referring now to FIG. 1, there is shown a circuit diagram for the system of this invention for encoding and recording a video signal. Scene light from a subject to be recorded is directed in a well-known manner by way of an objective lens and shutter (both not shown) to be incident upon the surface of a two-dimensional image light sensing array 12 which may be a charge-coupled device (CCD), a charge-injection device (CID), a photodiode array or any other conventional photosensitive array. The light sensing array 12 comprises a predetermined number of discrete image sensing areas or pixels 13 arranged in vertical columns and horizontal frame lines 1-6 wherein each column is superposed by either a cyan, green or yellow colored filter arranged in a well-known manner as shown in the drawing. Although cyan, green and yellow filters are shown by way of example, it will be well understood that other color filter combinations could also be utilized such as the primary red, green and blue colors as is also well known in the art. In addition, it will be well understood that although the image sensing array 12 is illustrated as comprising only 36 image sensing areas or pixels 13 arranged in 6 horizontal field lines, that in reality such image sensing arrays preferably comprise many thousands of such pixels 13 arranged in hundreds of horizontal frame lines.

Electronic information signals corresponding to the subject colors sensed are transferred from the image sensing array 12 in serial fashion by a serial shift register 14 as is well known in the art. The serial shift register 14 operates to provide a continuous stream of cyan, green and yellow analog color component signals from each succeeding line (1-6) of the light sensing elements 13 in the two-dimensional array 12 as shown below:

| Line 6 | | Line 2 | Line 1 |
|--------|---|--------|--------|
| CGYCGY | ... | CGYCGY | CGYCGY |

In this manner, means are provided for sensing at least three different colors of light, i.e., cyan, green and yellow, from a subject along a plurality of succeeding substantially parallel lines (1-6) over the two-dimensional light sensing array 12 and for providing an electronic information color component signal for each of the light colors so sensed. The electronic information color component signal from the serial shift register 14, in turn, is directed by way of a preamplifier 16 and amplifier 18 for conversion from an analog format to a digital format by an analog-to-digital converter 20. The digitally formatted color component output signals from the analog-to-digital converter 20 are thereafter stored in a random access memory (RAM) 22 for a limited time interval. The digitally formatted color component signals stored in the random access memory 22 are thereafter reformatted back to an analog signal by way of a digital-to-analog converter 24.

The analog formatted color component signals from the digital-to-analog converter 24 are thereafter directed to a multiplexer 26 wherein the color component signals for the odd field lines (1, 3 and 5) of the image sensing array 12 are separated from the color component signals for the even field lines (2, 4 and 6) of the image sensing array 12. The odd field line color component signals are directed to a delay line 28 wherein the signals are delayed by one line interval so that the color component signals for each odd field line arrive at a demultiplexer 30 in synchronism with the arrival of the color component signals for each even field line at a demultiplexer 32. In this manner the delay circuit 28 operates to substantially eliminate any phase difference between the color component signals from the odd and even field lines. The demultiplexer circuits 30 and 32 operate, in turn, to demultiplex the yellow, green and cyan color component signals, respectively, to provide output color component signals as shown below:

| Line 6 | | Line 2 | Line 1 |
|--------|---|--------|--------|
| C _ _ C _ _ | | C _ _ C _ _ | C _ _ C _ _ |
| _ G _ _ G _ | ... | _ G _ _ G _ | _ G _ _ G _ |
| _ _ Y _ _ Y | | _ _ Y _ _ Y | _ _ Y _ _ Y |

Thus, it can be seen that each pixel of the light sensing array 12 is identified by only one color component signal and that the other two color component signals must be interpolated for each pixel in order for each pixel to be identified by the three yellow, green and cyan color component signals. Toward this end, sample and hold circuits 34, 36, 38, 40, 42 and 44 are provided to sample and hold each color component signal for both the odd and even field lines respectively to provide two interpolated color component signals for each pixel of the image sensing array 12 thereby providing the output color component signals as illustrated below.

| Line 6 | | Line 2 | Line 1 |
|--------|---|--------|--------|
| CCCCCC | ... | CCCCCC | CCCCCC |
| GGGGGG | | GGGGGG | GGGGGG |
| YYYYYY | | YYYYYY | YYYYYY |

The cyan, green and yellow color component signals from the sample and hold circuits 34, 36 and 38 are directed to a color matrix circuit 46 for conversion to a luminance signal (Y) at output terminal A and a first chrominance signal (R-Y) at output terminal B for the odd field lines. In like manner, the yellow, green and cyan color component signals from the sample and hold circuits 40, 42 and 44 are directed respectively for conversion by a color matrix circuit 48 to a luminance signal (Y) at output terminal C and a second chrominance signal (B-Y) at output terminal D for the even field lines. As is well understood, B in the first chrominance signal (B-Y) represents the color blue and R in the second chrominance signal (R-Y) represents the color red. The color matrix equations for the matrix circuits 46 and 48 are derived in the following manner. Yellow, green and cyan color component signals can be matrixed to provide red, green and blue color component signals in accordance with the following matrix equation:

$$\begin{bmatrix} R \\ G \\ B \end{bmatrix} = \begin{bmatrix} 2 & -1 & 0 \\ 0 & 1 & 0 \\ 0 & -1 & 2 \end{bmatrix} \begin{bmatrix} Ye \\ G \\ C \end{bmatrix}$$

The red, green and blue color components can, in turn, be matrixed to provide the luminance signal (Y), the first chrominance signal (R-Y) and the second chrominance signal (B-Y) in accordance with the following matrix equation:

$$\begin{bmatrix} Y \\ R-Y \\ B-Y \end{bmatrix} = \begin{bmatrix} .299 & .587 & .114 \\ .701 & -.587 & -.114 \\ -.299 & -.587 & .886 \end{bmatrix} \begin{bmatrix} R \\ G \\ B \end{bmatrix}$$

Combining the above matrix equations in the following manner provides the color matrix equation by which the yellow, green and cyan color component signals are matrixed to provide the luminance signal (Y), the first chrominance signal (R-Y) and the second chrominance signal (B-Y).

$$\begin{bmatrix} Y \\ R-Y \\ B-Y \end{bmatrix} = \begin{bmatrix} .299 & .587 & .114 \\ .701 & -.587 & -.114 \\ -.299 & -.587 & .886 \end{bmatrix} \begin{bmatrix} 2 & -1 & 0 \\ 0 & 1 & 0 \\ 0 & -1 & 2 \end{bmatrix} \begin{bmatrix} Ye \\ G \\ C \end{bmatrix}$$

or $$\begin{bmatrix} Y \\ R-Y \\ B-Y \end{bmatrix} = \begin{bmatrix} .598 & 1.174 & .228 \\ 1.402 & -1.174 & -.228 \\ -.598 & -1.174 & 1.772 \end{bmatrix} \begin{bmatrix} Ye \\ G \\ C \end{bmatrix}$$

As a result of the color component signals being temporarily stored in the random access memory 22 and the effect of the delay circuit 28, the output signals from the matrix circuits 46 and 48 at output terminals A, B, C and D are tabulated as shown in the following Table No. 3 where the subscripts reference field lines.

TABLE NO. 3

| A | B | C | D |
|---|---|---|---|
| $Y_1$ | $R_1 - Y_1$ | $Y_2$ | $B_2 - Y_2$ |

TABLE NO. 3-continued

| A | B | C | D |
|---|---|---|---|
| $Y_3$ | $R_3 - Y_3$ | $Y_4$ | $B_4 - Y_4$ |
| $Y_5$ | $R_5 - Y_5$ | $Y_6$ | $B_6 - Y_6$ |

The luminance and chrominance output signals as tabulated above in Table No. 3 are directed to input a multiplex or switch circuit 49. The multiplexer 49 first operates to connect the luminance signal (Y) from the output terminal A of matrix 46 to output terminal E while alternately connecting the first chrominance signal (R-Y) from output terminal B of matrix 46 and the second chrominance signal (B-Y) from output terminal D of matrix 48 to output terminal F. The luminance and chrominance signals outputted at terminals E and F respectively from the multiplex circuit 49 are tabulated in Table No. 4 as follows:

TABLE NO. 4

| E | F |
|---|---|
| $Y_1$ | $R_1 - Y_1$ |
| $Y_3$ | $B_4 - Y_4$ |
| $Y_5$ | $R_5 - Y_5$ |

From the above Table No. 4, it is apparent that the luminance signals for the odd field lines appear in alternate association respectively with the first and second chrominance signals for first select alternate odd field lines and alternate even field lines. The first select alternate odd field lines for which the first chrominance signals are provided are lines 1 and 5, but would include lines 9, 13, 17, etc. for light sensing arrays having substantially more field lines, while the first select alternate even field lines for which the second chrominance signals are provided include only line 4 for the example shown, but would include lines 8, 12, 16, etc. for light sensing arrays having substantially more field lines. The above luminance and chrominance signals of Table No. 4 are thereafter FM modulated by FM modulator circuits 52 and 50, respectively, and subsequently amplified by a drive amplifier 54 for recording by a recording head 56 on a first track of a magnetic recording disk 58 which preferably conforms to the afore-mentioned 47 mm floppy disk format. Thus, in this manner, the luminance signals for every one of the odd field lines is recorded in alternate association respectively with the first select alternate odd field lines of the first chrominance signal and the first select alternate even field lines of the second chrominance signal.

After the luminance and chrominance signals are recorded in the above manner for the odd field lines, the multiplexer circuit 49 then operates to connect the luminance output signal (Y) from the output terminal C of the matrix circuit 48 to the output terminal E of the multiplex circuit 49 while alternately connecting the first chrominance signal (R-Y) from the output terminal B of matrix 46 and the second chrominance signal (B-Y) from the output terminal D of matrix 48 to the output terminal F. The luminance and chrominance signals appear at the output terminals E and F respectively as tabulated below in Table No. 5:

TABLE NO. 5

| E | F |
|---|---|
| $Y_2$ | $B_2 - Y_2$ |
| $Y_4$ | $R_3 - Y_3$ |

TABLE NO. 5-continued

| E | F |
|---|---|
| $Y_6$ | $B_6 - Y_6$ |

From the above tabulated data of Table No. 5, it can be seen that the luminance signals for every one of the even field lines is provided in alternate association respectively with the first and second chrominance signals for second select alternate odd and alternate even field lines. The second select alternate odd field lines can be seen to include only line 3, but would include lines 7, 11, 15, etc. for light sensing arrays having substantially more field lines, while the second select alternate even lines are 2 and 6, but would include lines 10, 14, 18, etc. for light sensing arrays having substantially more field lines. The luminance signals for the even field lines at output terminal E and the first and second chrominance signals for the second select alternate odd and alternate even field lines at output terminal F are subsequently FM modulated by FM modulator circuits 52 and 50, respectively and thereafter amplified by the drive amplifier 54 for recording on a second track of the magnetic disk 58 by the recording head 56. Thus, in this manner the luminance signals for all the even field lines are recorded in alternate association respectively with the second select alternate even field lines of the second chrominance signal and second select alternate odd field lines of the first chrominance signal. As will be well understood, a central processing unit (CPU) or controller (not shown) operates to control the sequence in which electronic information signals are transmitted between the various components in the manner as previously described.

Figure 2:
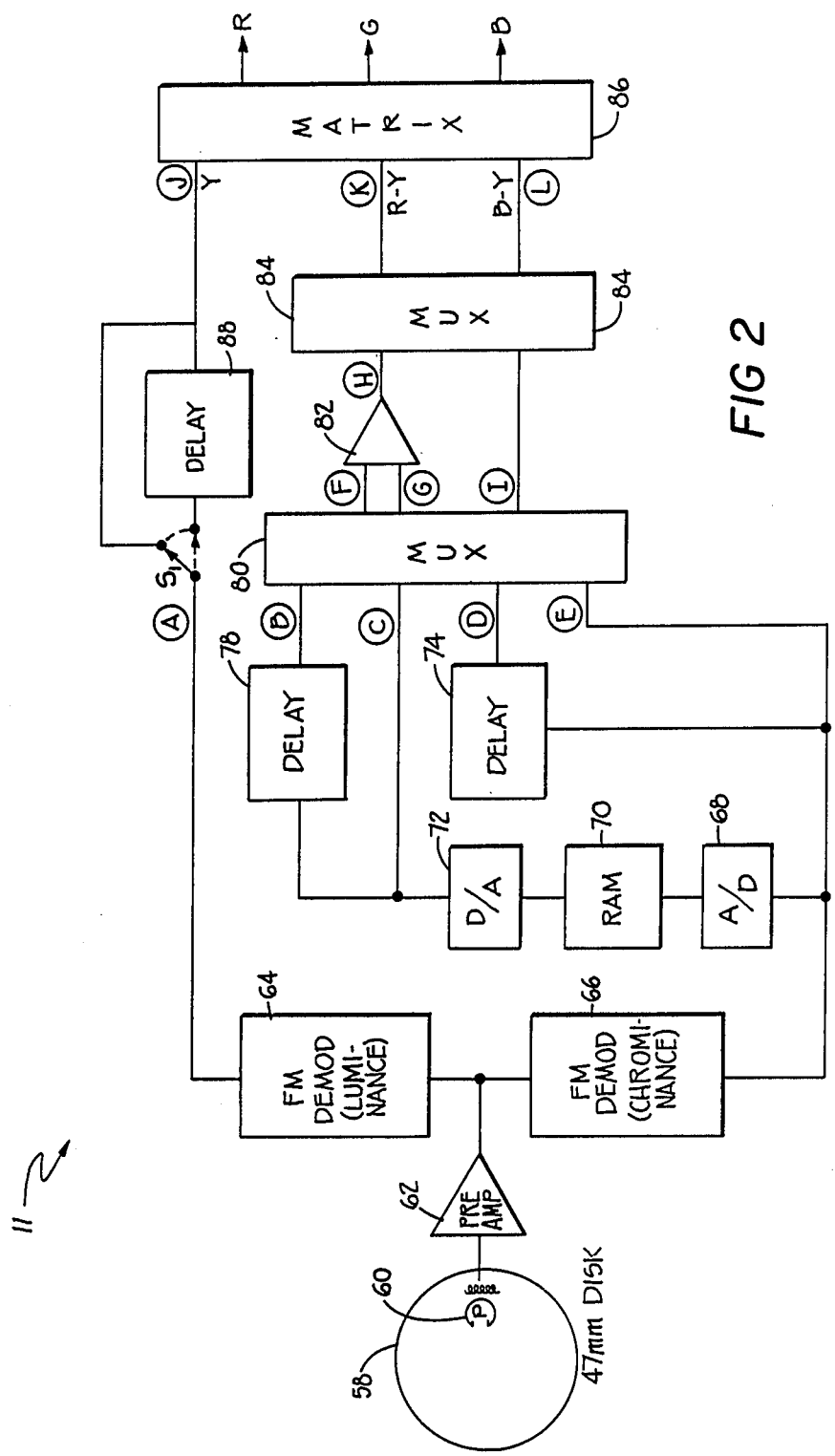
FIG. 2 is a circuit diagram for the system of this invention for decoding a video signal recorded by the system of FIG. 1.

Referring now to FIG. 2, there is shown at 11 the circuit of this invention for decoding the electronic image information stored on the disk 58 in the aforementioned manner. The electronic image information stored on the disk 58 is read by a playback head 60 to provide electronic information signals that are subsequently amplified by a preamplifier 62 and thereafter demodulated by FM demodulators 64 and 66 to provide respectively luminance signals and chrominance signals. Playback begins with the recording head first reading the first and second chrominance signals for the second select alternate odd field lines and alternate even field lines recorded on the second track in association with the luminance signals for the even field lines. The first and second chrominance signals for the second select alternate odd field lines and alternate even field lines are amplified by the amplifier 62 and FM demodulated by the demodulator 66 prior to conversion from an analog format to a digital format by an analog-to-digital converter 68. The digitally formatted chrominance signals are thereafter stored for a determinate time interval in a random access memory (RAM) 70.

The playback head 60 thereafter reads the luminance signals for the odd field lines recorded on the first track of the disk 58 together with its associated chrominance signals for the first select alternate odd field lines and alternate even field lines. The chrominance signals for the first select alternate odd field lines and alternate even field lines are demodulated by the FM demodulator 66 while the associated luminance signals for the odd field lines are FM demodulated by the FM demodulator 64. At the same time that the chrominance signals for the second select alternate odd field lines and alternate even field lines are read out from the RAM 70, the chrominance signals for the first select alternate odd field lines and alternate even field lines are played back from the disk 58 and stored in the random access memory 70. The chrominance signals for the second select alternate even field lines and alternate odd field lines are converted from the digital format to an analog format by way of the digital-to-analog converter 72. Line delay circuits 74 and 78 operate to delay the chrominance signals in a manner so as to provide the output signals at lines A, B, C, D and E as tabulated below in Table No. 6:

TABLE NO. 6

| A | B | C | D | E |
|---|---|---|---|---|
| $Y_1$ | — | $B_2 - Y_2$ | — | $R_1 - Y_1$ |
| $Y_3$ | $B_2 - Y_2$ | $R_3 - Y_3$ | $R_1 - Y_1$ | $B_4 - Y_4$ |
| $Y_5$ | $R_3 - Y_3$ | $B_6 - Y_6$ | $B_4 - Y_4$ | $R_5 - Y_5$ |

As is readily apparent from the above Table No. 6 tabulation, it can be seen that line delay circuits 74 and 78 operate to delay the chrominance signals on lines D and B respectively by one field line. From the above Table No. 6, it is readily apparent that the first chrominance signal (R-Y) for each odd field line is present at the same instant that the luminance signal (Y) for each odd field line appears and that the second chrominance signal (B-Y) is also present for each adjacent even field line thereby enabling an interpolated value for the second chrominance signal to be calculated for each odd field line. For instance, it can be seen that the luminance signal ($Y_1$) for the first field line appears at line A simultaneously with the first chrominance signal ($R_1-Y_1$) on line E together with the adjacent second chrominance signal ($B_2-Y_2$). In like manner, the luminance signal ($Y_3$) for the third field line is provided simultaneously with the first chrominance signal ($R_3-Y_3$) on line C together with the adjacent second chrominance signals ($B_2-Y_2$) on line B and ($B_4-Y_4$) on line E which are averaged together by the averaging circuit 82 to provide an average second chrominance signal for the third field line. A multiplex or switch circuit 80 operates to provide the output chrominance signals on lines F, G and I as tabulated below in Table No. 7:

TABLE NO. 7

| F | G | I | H |
|---|---|---|---|
| — | — | $R_1 - Y_1$ | — |
| $B_2 - Y_2$ | $B_4 - Y_4$ | $R_3 - Y_3$ | $[(B_2 - Y_2) + (B_4 - Y_4)]/2$ |
| $B_4 - Y_4$ | $B_6 - Y_6$ | $R_5 - Y_5$ | $[(B_4 - Y_4) + (B_6 - Y_6)]/2$ |

An averaging circuit 82 thereafter operates to add the chrominance signals (B-Y) from lines F and G and divide the result by two to provide an output average value on line H as shown in the above Table No. 7 for the chrominance signals which in this instance are the average second chrominance signals for the even field lines. The output signals are transmitted by a multiplex or switch circuit 84 to provide the first chrominance signals (R-Y) on line K for each set of odd field lines simultaneously with first interpolated chrominance signals (B-Y) on line L as a function of the average of the second chrominance signals for adjacent even field lines.

With switch $S_1$ moved to the solid line position to bypass line delay circuit 88, the luminance signal Y on line J, the first chrominance signal (R-Y) on line K, and the interpolated second chrominance signal (B-Y) on line L are thereafter converted to well-known red, green and blue color component signals by matrix circuit 86 operating in a well-known manner. The red, green and blue color component signals may thereafter be utilized in a well-known manner to provide a visible image of the subject on either the screen of a CRT or by way of any conventional hard copy printer such as photographic, thermal, ink jet, etc. The output red, green and blue color component signals may be derived from the luminance (Y) signals and the chrominance signals (R-Y), (B-Y) by the following matrix equation:

$$\begin{bmatrix} R \\ G \\ B \end{bmatrix} = \begin{bmatrix} 1 & 1 & 0 \\ 1 & -0.509 & -0.194 \\ 1 & 0 & 1 \end{bmatrix} \begin{bmatrix} Y \\ R-Y \\ B-Y \end{bmatrix}$$

After the odd field lines are decoded and reconstructed in the aforementioned manner, the playback head is moved to the second track of the recording disk 58 to read out the image data recorded for the even field lines. As previously discussed, the chrominance signals for the first select alternate odd field lines and alternate even field lines were stored in the random access memory (RAM) 70 and replaced the chrominance signals for the second select alternate odd field lines and alternate even field lines which were read out to derive the color component signals for the odd field lines. The switch $S_1$ is moved to its phantom line position so as to delay the luminance signal on line A by one field line. In a manner analogous to the above-described playback operation, the luminance signals for the even field lines and the associated chrominance signals for the second select alternate odd field lines and alternate even field lines are played back at the same time that the chrominance signals for the first select alternate odd field lines and alternate even field lines are read out from the random access memory 70 and converted to an analog format by the digital-to-analog converter 72 so as to cause the signals to appear at lines J, B, C, D and E as tabulated below in Table No. 8:

TABLE NO. 8

| J | B | C | D | E |
|---|---|---|---|---|
| — | — | $R_1 - Y_1$ | — | $B_2 - Y_2$ |
| $Y_2$ | $R_1 - Y_1$ | $B_4 - Y_4$ | $B_2 - Y_2$ | $R_3 - Y_3$ |
| $Y_4$ | $B_4 - Y_4$ | $R_5 - Y_5$ | $R_3 - Y_3$ | $B_6 - Y_6$ |
| $Y_6$ | $R_5 - Y_5$ | $B_8 - Y_8$ | $B_6 - Y_6$ | $R_7 - Y_7$ |

Thus, from the signals tabulated above in Table No. 8, it can be seen that all the luminance and chrominance signals appear simultaneously for each field line in order to recreate the entire even line field. For instance, it can be seen that the luminance signal ($Y_2$) for the second field line appears at line J simultaneously with the second chrominance signal ($B_2-Y_2$) on line D together with adjacent first chrominance signals ($R_1-Y_1$) on line B and ($R_3-Y_3$) on line E which may be averaged together by averaging gate 82 in the aforementioned manner to provide an average first chrominance signal value for the second field line. In like manner, the luminance signal $Y_4$ for the fourth field line is provided simultaneously with the second chrominance signal ($B_4-Y_4$) on line B together with the first chrominance signal ($R_5-Y_5$) on line C and ($R_3-Y_3$) on line D which are averaged together by the averaging circuit 82 to provide an average first chrominance signal for the fourth field line. As is readily apparent, the above-described operation continues on the remaining even field lines to provide the output chrominance signals on lines F, G, I, and H as tabulated below in Table No. 9:

TABLE NO. 9

| F | G | I | H |
|---|---|---|---|
| $R_1 - Y_1$ | $R_3 - Y_3$ | $B_2 - Y_2$ | $[(R_1 - Y_1) + (R_3 - Y_3)]/2$ |
| $R_3 - Y_3$ | $R_5 - Y_5$ | $B_4 - Y_4$ | $[(R_3 - Y_3) + (R_5 - Y_5)]/2$ |
| $R_5 - Y_5$ | $R_7 - Y_7$ | $B_6 - Y_6$ | $[(R_5 - Y_5) + (R_7 - Y_7)]/2$ |

The average first chrominance signals on line H and the second chrominance signals on line I are thereafter transmitted by the multiplexing circuit 84 to provide average first chrominance signals (R-Y) on line K together with second chrominance signals (B-Y) on line L. The luminance signals Y on line J are thereafter matrixed with the first and second chrominance signals by the matrix circuit 86 to provide the red, green and blue color component signals as previously described. The color component signals may thereafter be utilized in a conventional manner to reconstruct the even line field of the subject image either in a CRT display screen or as a hard copy. Thus, there can be provided an image with as much as twice the vertical chrominance resolution of an image conventionally provided from a 47 mm video floppy player since the chrominance samples of this invention are spaced only two field lines apart in contrast to a conventional player which interpolates between chrominance lines independently for each field resulting in an image with chrominance samples effectively spaced four field lines apart. The technique of this invention is applicable to any conventional video format where alternate color components are stored on each field line such as PAL and may be used with any CCD regardless of whether the color filters are arranged in vertical stripes as previously described or in any other mosaic filter pattern as is well known in the art.

Luminance and chrominance signals recorded in the manner as shown in Tables 4 and 5 could not be decoded by conventional playback devices. However, by delaying the second chrominance signals (R-Y) by one field line, the luminance and chrominance signals can be outputted at terminals E and F respectively as tabulated in the following tables 10 and 11 where the light sensing array 12 includes at least seven (7) horizontal lines:

TABLE NO. 10

| E | F |
|---|---|
| $Y_1$ | $R_1 - Y_1$ |
| $Y_3$ | $B_2 - Y_2$ |
| $Y_5$ | $R_5 - Y_5$ |

TABLE NO. 11

| E | F |
|---|---|
| $Y_2$ | $R_3 - Y_3$ |
| $Y_4$ | $B_4 - Y_4$ |
| $Y_6$ | $R_7 - Y_7$ |

The sequence in which electronic signals are transmitted by the decoding circuit 11 may be conventionally modified to enable the circuit 11 to decode the luminance and chrominance signals tabulated in Tables 10 and 11 as well as luminance and chrominance signals recorded in a standard format. The recording disk 58 on which luminance and chrominance signals are recorded as shown in Tables 10 and 11 may also be played back on a conventional playback device as well as the decoding circuit 11 of this invention. However, luminance and chrominance signals recorded in the manner of this invention and played back on a conventional playback device will not have the high vertical chrominance resolution achievable with the decoder 11 of this invention. In addition, luminance and chrominance signals recorded in a standard format and played back with the decoder 11 of this invention will also not have the high vertical chrominance resolution achievable by recording the luminance and chrominance signals in the manner of this invention.

Other changes may be made in the above-described embodiment without departing from the scope of the invention herein involved, therefore it is intended that all matter contained in the above description or shown in the accompanying drawings be interpreted as illustrative and not in a limiting sense.

What is claimed is:

1. A system for encoding and recording a video signal comprising:
    means for sensing at least three different colors of light from a subject along a plurality of succeeding substantially parallel lines over a two-dimensional light sensing area and providing an electronic information color component signal for each of the light colors so sensed;
    means for providing: a luminance signal as a function of a select matrix of said color component signals for each of said substantially parallel lines; a first chrominance signal as a function of said select matrix of said color component signals for every odd line of said substantially parallel lines; and a second chrominance signal as a function of said select matrix of said color component signals for every even line of said substantially parallel lines;
    means for combining said luminance signal for every one of said odd lines of said substantially parallel lines in a manner whereby said luminance signals for every one of said odd lines are combined in alternate association respectively with first select alternate odd lines of said first chrominance signal and first select alternate even lines of said second chrominance signal and for combining said luminance signal for every one of said even lines of said substantially parallel lines in a manner whereby said luminance signals for said even lines are combined in alternate association respectively with second select alternate even lines of said second chrominance signal and second select alternate even lines of said first chrominance signal; and
    means for recording said combined signals.

2. The system of claim 1 for use with a recording media of the type on which information can be recorded on two spaced apart tracks wherein said recording means operates to record said combined signal which includes luminance signals for odd lines on a first track of the recording media and to record said combined signal which includes luminance signals for even lines on a second track of the recording media.

3. The system of claim 2 wherein said means for providing said luminance and chrominance signals comprises: means for separating said color component signals to provide at a first output terminal the color component signals for said odd lines and at a second output terminal the color component signals for said even lines, first means for matrixing the color component signals for said odd lines to provide the luminance signals for said odd lines and said first chrominance signals for said even lines to provide the luminance signals for said even lines and said second chrominance signals.

4. The system of claim 3 wherein said separating means comprises means for multiplexing said color component signals and said means for providing said luminance and chrominance signals comprise means for delaying the color component signals from either one of said first and second output terminals from said multiplexer for a time period substantially equal to the phase difference between the color component signals from said first and second output terminals, and means for demultiplexing the color component signals from said delay means and the other one of said first and second output terminals prior to matrixing by said first and second matrix means.

5. The system of claim 4 including means for sampling and holding each color component signal received from said demultiplexing means for interpolating portions thereof not sensed by sensing means prior to matrixing by said first and second matrix means.

6. The system of claim 3 wherein said recording means comprises means for multiplexing the luminance and chrominance signals from said first and second matrixing means in a manner whereby the luminance signals output from said first matrix means are continuously transmitted for recording while the first chrominance signals output from said first matrix means and the second chrominance signals output from said second matrix means for said first select alternate odd and alternate even lines are alternately transmitted for recording on the first track of the recording media and the luminance signals output from said second matrix means are thereafter continuously transmitted for recording while the first chrominance signal output from said first matrix means and the second chrominance signal output from said second matrix means for said second select alternate odd lines and alternate even lines are alternately transmitted for recording on the second track of the recording media.

7. The system of claim 1 wherein said means for providing said luminance and chrominance signals comprises an analog-to-digital converter for converting the electronic information color component signals received from said light sensing means from an analog to a digital format, buffer memory means for storing the electronic information color component signals received from said analog-to-digital converter, and a digital-to-analog converter for converting the electronic information color component signals received from said buffer memory means from their digital format back to an analog format.

8. The system of claim 1 wherein said three different colors of light sensed from the subject by said light sensing means are cyan, green, and yellow and said luminance, first chrominance and second chrominance signals are provided as a function of said select matrix of said cyan, green and yellow color component signals in accordance with the equations:
luminance=0.598(yellow)+1.174(green)+0.228(cyan), first chrominance=1.402(yellow)−1.174(green)−0.228(cyan), second chrominance=0.598(yellow)−1.174(green)+1.772(cyan).

9. A system for decoding video image information recorded in both even and odd field lines on a recording medium wherein luminance information is recorded for both the even and odd field lines, first chrominance information is recorded for the odd field lines and second chrominance information is recorded for the even field lines, comprising:

means for converting the recorded luminance information to electronic luminance signals in a select order of field lines whereby all of either the even or odd field lines are first converted and then all of the remaining odd or even field lines are thereafter converted;

means for converting: the first chrominance information to first electronic chrominance signals in synchronism with the conversion of said luminance signals for odd field lines, the second chrominance information to second electronic chrominance signals in synchronism with the conversion of said luminance signals for said even field lines, and thereafter interpolating odd field lines from said second chrominance signals in synchronism with the conversion of said luminance information for said odd field lines, and the first chrominance information to said first chrominance signals and thereafter interpolating even field lines from said first chrominance signals in synchronism with the conversion of said luminance information for said even field lines and the second chrominance information to said second chrominance signals, and means for matrixing: said luminance signals for said odd and even field lines, said first and second chrominance signals, and said interpolated chrominance signals for said odd and even field lines to provide electronic information color component signals from which a visible image of the recorded information may be made.

10. A system for decoding video image information recorded in both even and odd field lines on a recording medium wherein luminance information is recorded for both the even and odd field lines, first chrominance information is recorded for the odd field lines and second chrominance information is recorded for the even field lines, comprising:

means for converting the recorded luminance information to electronic luminance signals in a select order of field lines whereby all of either the even or odd field lines are first converted and then all of the remaining odd or even field lines are thereafter converted;

means for converting: the first chrominance information to first electronic chrominance signals in synchronization with the conversion of said luminance signals for said odd field lines, the second chrominance information to second electronic chrominance signals in synchronization with the conversion of said luminance signals for said even field lines, and thereafter interpolating odd field lines from said second chrominance signals in synchronization with the conversion of said luminance information for said odd field lines, and the first chrominance information to said first chrominance signals and thereafter interpolating even field lines from said first chrominance signals in synchronization with the conversion of said luminance information for said even field lines and the second chrominance information to said second chrominance signals, and means for matrixing: said luminance signals for said odd and even field lines, said first and second chrominance signals, and said interpolated chrominance signals for said odd and even field lines to provide electronic information color component signals from which a visible image of the recorded information may be made, said system being for use with a recording media of the type on which information is recorded on two spaced apart tracks, the first track of which has luminance information for the odd field lines and first and second chrominance information for first select alternate odd field lines and alternate even field lines respectively recorded thereon and the second track of which has luminance information for the even field lines and second and first chrominance information for second select alternate even field lines and alternate odd field lines respectively recorded thereon, wherein said converting means includes a memory for storing and means for synchronously providing said first and second chrominance signals for said first select alternate odd field lines and alternate even field lines for storage by said memory and said luminance information for said even field lines and said second and first chrominance information for said second select alternate even field lines and alternate odd field lines for conversion by said converting means and alternatively for for synchronously providing said second and first chrominance signals for said second select alternate even field lines and alternate odd field lines for storage by said memory and said luminance information for said odd field lines and said first and second chrominance information for said first select alternate odd field lines and alternate even field lines for conversion by said converting means.

11. The system of claim 10 wherein said converting means comprises a multiplexing and delay means for receiving said first and second chrominance signals for said first select alternate odd field lines and alternate even field lines from said memory and said first and second chrominance signals for said second select alternate odd field lines and alternate even field lines to provide said second chrominance signals for each of said even field lines simultaneously with said first chrominance signal for each adjacent odd field line and alternatively for receiving said first and second chrominance signals for said second select alternate odd field lines and alternate even field lines from said memory and said first and second chrominance signals for said first select alternate odd field lines and alternate even field lines to provide said first chrominance signals for each of said odd field lines simultaneously with said second chrominance signals for each adjacent even field line and averaging means for providing first interpolated chrominance signals for each even field line as a function of the average of said first chrominance signals for said adjacent odd field lines and for providing second interpolated chrominance signals for each odd field line as a function of the average of said second chrominance signals for said adjacent even field lines.

12. The system of claim 11 wherein said converting means further includes a first frequency demodulator for demodulating said luminance signals for said odd and even field lines, means for selectively delaying the luminance signals for one field line, and a second frequency demodulator for demodulating said first and second chrominance signals.

13. The system of claim 10 wherein: said converting means comprises an analog-to-digital converter for converting said first and second chrominance signals from an analog to a digital format; said memory stores said first and second chrominance signals received from said analog-to-digital converter; and said converting means further comprises a digital-to-analog converter for converting said first and second chrominance signals received from said memory from a digital format back to an analog format.

14. A system for decoding video image information recorded in both even and odd field lines on a recording medium wherein luminance information is recorded for both the even and odd field lines, first chrominance information is recorded for the odd field lines and second chrominance information is recorded for the even field lines, comprising:
   means for converting the recorded luminance information to electronic luminance signals in a select order of field lines whereby all of either the even or odd field lines are first converted and then all of the remaining odd or even field lines are thereafter converted;
   means for converting: the first chrominance information to first electronic chrominance signals in synchronization with the conversion of said luminance signals for said odd field lines, the second chrominance information to second electronic chrominance signals in synchronization with the conversion of said luminance signals for said even field lines, and thereafter interpolating odd field lines from said second chrominance signals in synchronization with the conversion of said luminance information for said odd field lines, and the first chrominance information to said first chrominance signals and thereafter interpolating even field lines from said first chrominance signals in synchronization with the conversion of said luminance information for said even field lines and the second chrominance information to said second chrominance signals, and
   means for matrixing: said luminance signals for said odd and even field lines, said first and second chrominance signals, and said interpolated chrominance signals for said odd and even field lines to provide electronic information color component signals from which a visible image of the recorded information may be made, wherein said color component signals are respectively red, green and blue color component signals and are provided as a function of a select matrix of said luminance and said first and second chrominance signals including said interpolated chrominance signals in accordance with the equations:
red=luminance+first chrominance, green=luminance−0.509(first chrominance)−0.194 (second chrominance), blue=luminance+second chrominance.

15. A method for sampling, encoding and recording a video signal comprising the steps of:
   sensing at least three different colors of light from a subject along a plurality of succeeding substantially parallel lines over a two-dimensional light sensing area;
   matrixing said color component signals for each of said substantially parallel lines to provide: a luminance signal; a first chrominance signal for every odd line of said substantially parallel lines, and a second chrominance signal for every even line of said substantially parallel lines;
   combining said luminance signal for every one of said odd lines of said substantially parallel lines in a manner whereby said luminance signals for said odd lines are combined in alternate association respectively with first select alternate odd lines of said first chrominance signal and first select alternate even lines of said second chrominance signal;
   combining said luminance signal for every one of said even lines of said substantially parallel lines in a manner whereby said luminance signals for said even lines are combined in alternate association respectively with second select alternate even lines of said second chrominance signal and second select alternate odd lines of said first chrominance signal; and
   recording the combined signals.

16. The method of claim 15 wherein:
   the recording media is of the type on which information can be recorded on two spaced apart tracks, and including recording the combined signals which include the luminance signals for odd lines on a first track of the recording media and recording the combined signals which include the luminance signals for even lines on a second track of the recording media.

17. The method of claim 16 further including the step of separating the color component signals for said odd and even lines wherein said step for matrixing said color component signals comprises the steps of matrixing the color component signals for said odd lines to provide the luminance signals for said odd lines and said first chrominance signals and matrixing the color component signals for said even lines to provide the luminance signals for said even lines and said second chrominance signals.

18. The method of claim 17 wherein the color component signals are separated for said odd and even lines by multiplexing and further comprising the step of delaying the color component signal for either said odd or even lines for a time substantially equal to the phase difference between the color component signals for said odd and even lines and demultiplexing the color component signals prior to matrixing.

19. The method of claim 18 further comprising the steps of sampling and holding each demultiplexed color component signal and interpolating portions thereof not previously sensed prior to matrixing.

20. The method of claim 16 further comprising the steps of multiplexing the matrixed luminance and chrominance signals in a manner so that the matrixed luminance signals for the odd lines are transmitted for recording at the same time that the matrixed first and second chrominance signals for said first select alternate odd lines and alternate even lines are alternately transmitted for recording on the first track of the recording media and so that the matrixed luminance signals for the even lines are transmitted for recording at the same time that the matrixed first and second chrominance signals for said second select alternate odd lines and alternate even lines are alternately transmitted for recording on the second track of the recording media.

21. The method of claim 15 further comprising the step of converting the sensed electronic information color component signals from an analog-to-digital format, storing the digitally formatted electronic information color component signals for a determinate time, and after said determinate time converting the electronic information color component signal back to an analog format.

22. The method of claim 15 wherein said light sensing step comprises sensing light through cyan, green and yellow filters and said step of matrixing said cyan, green, and yellow color component signals to provide said luminance, first chrominance and second chrominance signals is in accordance with the equations:
luminance=0.598(yellow)+1.174(green)+0.228(cyan), first chrominance=1.402(yellow)−1.174(green)−0.228(cyan), second chrominance=−0.598(yellow)−1.174(green)+1.772(cyan).

23. A method for decoding video image information recorded in both even and odd field lines on a recording medium wherein luminance information is recorded for both the even and odd field lines, first chrominance information is recorded for the odd field lines, and second chrominance information is recorded for the even field lines comprising the steps of:
  converting: the recorded luminance information to electronic luminance signals in a select order of field lines including converting all of either the even or odd field lines and then converting all of the remaining odd or even field lines; the first chrominance information to first electronic chrominance signals in synchronism with the conversion of said luminance signals for said odd field lines; the second chrominance information to second chrominance signals in synchronism with the conversion of said luminance signals for said even field lines; the second chrominance information to said second chrominance signals and thereafter interpolating odd field lines from said second chrominance signals in synchronism with the conversion of said luminance information for said odd field lines; and, said first chrominance information to said first chrominance signals and thereafter interpolating even field lines from said first chrominance signals in synchronism with the conversion of said luminance information for said even field lines; and
  matrixing said luminance signals for said odd and even field lines, said first and second chrominance signals and said interpolated chrominance signals for said odd and even lines to provide electronic information color component signals from which a visible image of the recorded information may be made.

24. A method for decoding video image information recorded in both even and odd field lines on a recording medium wherein luminance information is recorded for both the even and odd field lines, first chrominance information is recorded for the odd field lines, and second chrominance information is recorded for the even field lines comprising the steps of:
  converting: the recorded luminance information to electronic luminance signals in a select order of field lines including converting all of either the even or odd field lines and then converting all of the remaining odd or even field lines; the first chrominance information to first electronic chrominance signals in synchronism with the conversion of said luminance signals for saids odd field lines; the second chrominance information to second chrominance signals in synchronism with the conversion of said luminance signals for said even field lines; the second chrominance information to said second chrominance signals and thereafter interpolating odd field lines from said second chrominance signals in synchronism with the conversion of said luminance information for said odd field lines; and, said first chrominance information to said first chrominance signals and thereafter interpolating even field lines from said first chrominance signals in synchronism with the conversion of said luminance information for said even field lines; and
  matrixing said luminance signals for said odd and even field lines, said first and second chrominance signals and said interpolated chrominance signals for said odd and even lines to provide electronic information color component signals from which a visible image of the recorded information may be made wherein the recording media is of the type on which information is recorded on two spaced apart tracks, the first track of which has luminance information for the odd field lines and first and second chrominance information for first select alternate odd field lines and alternate even field lines respectively recorded thereon and the second track of which has luminance information for the even field lines and second and first chrominance information for second select alternate even field lines and alternate odd field lines respectively recorded thereon, said method further comprising the steps of storing said first and second chrominance signals for said first select alternate odd field lines and alternate even field lines while converting said luminance information for said even field lines and said second and first chrominance information for said second select alternate even field lines and alternate odd field lines to luminance signals and second and first chrominance signals respectively and storing said second and first chrominance signals for said second select alternate even field lines and alternate odd field lines while converting said luminance information for said odd field lines and said first and second chrominance information for said first select alternate odd field lines and alternate even field lines to luminance signals and first and second chrominance signals respectively.

25. The method of claim 24 wherein said step for converting includes multiplexing the previously stored first and second chrominance signals for said first select alternate odd lines and alternate even lines and said first and second chrominance signals for said second select alternate odd field lines and alternate even field lines to provide said second chrominance signals for each of said even field lines simultaneously with said first chrominance signals for adjacent odd field lines; alternatively multiplexing the previously stored first and second chrominance signals for said second select alternate odd field lines and alternate even field lines and said first and second chrominance signals for said first select alternate odd field lines and alternate even field lines to provide said first chrominance signals for each of said odd field lines simultaneously with said second chrominance signals for adjacent even field lines; averaging said first chrominance signals for each of said adjacent odd field lines to provide first interpolated chrominance signals for each even field line; and averaging said second chrominance signals for each of said adjacent even field lines to provide second interpolated chrominance signals for each odd field line.

26. The method of claim 25 wherein said converting step further comprises the steps of frequency demodulating said luminance signals for said odd and even field lines, selectively delaying the luminance signals for one field line, and frequency demodulating said first and second chrominance signals.

27. The method of claim 24 further including the steps of converting said first and second chrominance signals from an analog to a digital format, storing said digitally formatted first and second chrominance signals for a determinate time, and thereafter converting said first and second chrominance signals from a digital format back to an analog format.

28. A method for decoding video image information recorded in both even and odd field lines on a recording medium wherein luminance information is recorded for both the even and odd field lines, first chrominance information is recorded for the odd field lines, and second chrominance information is recorded for the even field lines comprising the steps of:

converting: the recorded luminance information to electronic luminance signals in a select order of field lines including converting all of either the even or odd field lines and then converting all of the remaining odd or even field lines; the first chrominance information to first electronic chrominance signals in synchronism with the conversion of said luminance signals for said odd field lines; the second chrominance information to second chrominance signals in synchronism with the conversion of said luminance signals for said even field lines; the second chrominance information to said second chrominance signals and thereafter interpolating odd field lines from said second chrominance signals in synchronism with the conversion of said luminance information for said odd field lines; and, said first chrominance information to said first chrominance signals and thereafter interpolating even field lines from said first chrominance signals in synchronism with the conversion of said luminance information for said even field lines; and matrixing said luminance signals for said odd and even field lines, said first and second chrominance signals and said interpolated chrominance signals for said odd and even lines to provide electronic information color component signals from which a visible image of the recorded information may be made wherein said luminance and said first and second chrominance signals including said interpolated chrominance signals are selectively matrixed to provide red, green and blue color component signals in accordance with the equations:

red=luminance+first chrominance, green=luminance−0.509(first chrominance)−0.194(second chrominance), blue=luminance+second chrominance.

* * * * *